US006847691B2

(12) United States Patent
Torikoshi et al.

(10) Patent No.: US 6,847,691 B2
(45) Date of Patent: Jan. 25, 2005

(54) TIME SYNCHRONIZING SYSTEM

(75) Inventors: Hideki Torikoshi, Hino (JP); Shigekazu Morita, Kawagoe (JP); Koichi Hamamatsu, Hinode-Machi (JP); Itsuo Shuto, Hachioji (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 719 days.

(21) Appl. No.: 09/782,153

(22) Filed: Feb. 14, 2001

(65) Prior Publication Data

US 2001/0017600 A1 Aug. 30, 2001

(30) Foreign Application Priority Data

Feb. 14, 2000 (JP) ...................................... 2000-034413

(51) Int. Cl.[7] .................................................. H04L 7/00
(52) U.S. Cl. .................. 375/354; 342/357.12; 713/400
(58) Field of Search ........................... 375/354; 713/400

(56) References Cited

U.S. PATENT DOCUMENTS 5,642,285 A 6/1997 Woo et al. ............... 364/449.7
5,717,403 A * 2/1998 Nelson et al. ......... 342/357.12
5,953,384 A * 9/1999 Walsh et al. ................ 375/354
6,199,170 B1 * 3/2001 Dietrich ....................... 713/400
6,236,623 B1 * 5/2001 Read et al. .................... 368/46
6,370,159 B1 * 4/2002 Eidson ........................ 370/503
6,611,922 B2 * 8/2003 Ozcetin et al. ............. 713/400
6,693,951 B1 * 2/2004 Gilhousen et al. .......... 375/130

FOREIGN PATENT DOCUMENTS

DE 42 02 435 8/1993
EP 0 327 083 8/1989
EP 0 987 845 3/2000

OTHER PUBLICATIONS

Patent Abstract of Japan, vol. 1998, No. 06, Minami Kikuchi, "System and Method of Automatic Correction for Computer, Built–In Watch", Apr. 30, 1998, Publication #10031083, Publication Date Feb. 1998.

Patent Abstract of Japan, vol. 2000, No. 10, Hideki Nakamura, "Satellite Communications Equipment, and Circuit For Maintaining Sychronization Thereof" Jan. 3, 2001, Pub. #2000224091, Pub. Date Aug. 2000.

* cited by examiner

*Primary Examiner*—Stephen Chin
*Assistant Examiner*—Cicely Ware
(74) *Attorney, Agent, or Firm*—Foley & Lardner LLP

(57) ABSTRACT

A time synchronization system comprises a GPS (Global Positioning System) receiver for receiving a time signal from a Global Positioning System (GPS), and outputting a UTC (Universal Time Coordinated) synchronization reference signal synchronizing with UTC and a UTC synchronization absolute time signal, and a time signal distributor for generating a reference time signal synchronizing with UTC from the synchronization reference signal and the absolute time signal, and transmits this reference time signal in distribution to a plurality of distributed control oriented terminal devices. The time synchronization between the plurality of distributed control oriented terminal devices can be thereby taken.

6 Claims, 6 Drawing Sheets

TIME SYNCHRONIZING SYSTEM

BACKGROUND OF THE INVENTION

1. Field of the Invention

The present invention relates to a time synchronizing system for unifying the time between a plurality of distributed control oriented terminal devices.

2. Related Background Art

Generally, what is dominant among a variety of plant monitor control systems is a distributed control system that includes, with developments of a microcomputer and a signal transmission technology, a plurality of terminal devices connected to each other via transmission lines. Further, in this type of monitor control system, an occurrence time data when a state change is added to various categories of input data given from the plant and recorded, and the state is thus displayed.

When the plant data received from the plant are transmitted to other terminal device via the transmission line from one terminal device, it is required that the time data be added.

In the terminal device receiving first the input data, a time signal is added in a state variation of the input data, time synchronization as precise as a required time resolution or higher needs to be taken between the terminal devices, and the prior art involves the use of transmission lines for connecting the terminal devices or signal lines dedicated to the time synchronization. In this case, the system is configured as a transmission system that accounts for the time synchronization, or hardware and software dedicated to the time synchronization are needed. This might induce a decrease in data transmission efficiency, and a decline of economical value, and might lose a continuity of time because of the time itself being rewritten when correcting the time.

Thus, according to the conventional method of adding the time signal to the input data, if a time resolution having a accuracy as high as 1 ms is required, a time synchronization signal process as precise as this resolution or higher needs to be executed. Nevertheless, it is difficult to actualize this and ensure the accuracy.

SUMMARY OF THE INVENTION

It is a primary object of the present invention, which was devised to obviate the problems given above, to provide a time synchronizing system capable of ensuring a data transmission efficiency and exhibiting a high accuracy and a good economical characteristic without being aware of a matter of time synchronization.

According to one aspect of the present invention a time synchronization system comprises a GPS (Global Positioning System) receiver for receiving a time signal from a Global Positioning System (GPS), and outputting a UTC (Universal Time Coordinated) synchronization reference pulse signal synchronizing with UTC and a UTC synchronization absolute time signal composed of a serial signal representing an absolute time, and a time signal distributor for generating a reference time signal by synthesizing the UTC synchronization reference signal and the UTC synchronization absolute time signal, and transmits this reference time signal in distribution to a plurality of distributed control oriented terminal devices.

With a spread of GPS over the recent years, the time signal as highly precise as ±1 μs with respect to UTC is available anywhere on the earth. By utilizing GPS described above, the pulse signal representing a time synchronization standard and the serial time signal representing an absolute time, which synchronize with UTC outputted from GPS, are transmitted in distribution to the plurality of distributed control oriented terminal devices from the time signal distributor, and the time synchronization between the terminal devices is batchwise taken. Hence, according to the present invention, it is feasible to easily obtain the reference time signal synchronizing with UTC over the world by use of GPS having a general-purposed characteristic. Further, the time signal distributor transmits the reference time to the plurality of terminal devices, thereby making it possible to simplify the system and execute a highly precise time synchronizing process.

The time signal distributor may synchronize a rising edge of the UTC synchronization reference signal with UTC, and may transmit the time synchronization signal to each of the terminal devices with a fixed period. This makes it feasible to attain an enhancement of the economical characteristic with simplified signal lines and a reduction in load of the transmission process.

The terminal device may include a reference clock operating in synchronization with the rising edge of the UTC synchronization reference signal, for generating a time signal representing a time on the finer order than a minimum time unit that is processed in the UTC synchronization absolute time signal, and an internal clock correction module for comparing an internal time value based on the reference clock with an external time value synchronizing with the UTC synchronization reference signal, and correcting the reference clock so that the time of the reference clock synchronizes with the UTC synchronization reference signal. With this architecture, the time signal on the order of second or larger involves the use of the absolute time signal given from the time signal distributor, and the time signal on the order of milli second which is not contained in the time signal from GPS, can be easily synchronized in time on the unit of milli second by matching the internal clock with the reference clock synchronizing with UTC, using the absolute time signal given from the time signal distributor.

The internal clock correction module may include a module for changing a unit delimiting width of the correction, corresponding to a magnitude of a time difference. With this configuration, when a width of deviation of the internal clock from the reference clock is smaller than at a start-up of the time synchronization target process, the reference pulse inputted to the time counter that is used as the internal time data is changed, and the time synchronization between the terminal devices can be taken with a high accuracy without exerting any influence upon the time value itself.

If impossible of receiving the UTC synchronization time signals from an internal reference signal generator for generating an internal reference signal synchronizing with the UTC synchronization reference signal, an internal absolute time signal generator for generating an internal absolute time signal equal to the UTC synchronization absolute time signal and the GPS receiver, the signal synthesizing unit of the time signal distributor may generate an internal time signal by synthesizing the internal reference signal and the internal absolute time signal, and may transmit this internal time signal as a substitute for the reference time signal in distribution to the respective terminal devices. With this contrivance, if unable to receive the time signals from the GPS receiver due to some sort of fault, the internal time signal generated within the time signal distributor is transmitted to each of the terminal devices, whereby the time synchronization between the terminal devices can be kept.

The time signal distributor, if impossible of receiving the time signal from the GPS receiver, may synthesize the internal time signal so that the internal reference signal and the internal absolute time signal are not overlapped in time. This contrivance makes it possible to avoid such a state as to lead to non-synchronization of the time due to each terminal device making a mis-recognition about the time signal.

The terminal devices may include an internal clock and, if unable to receive the reference time signal from the time signal distributor, may continue a time signal process by use of the internal clock. Even if impossible of receiving the reference time signal from the time signal distributor due to some sort of fault, the time synchronization between the terminal devices can be ensured by use of the internal time signal synchronizing with the internal reference time of each terminal device.

DESCRIPTION OF THE PREFERRED EMBODIMENTS

Figure 1:
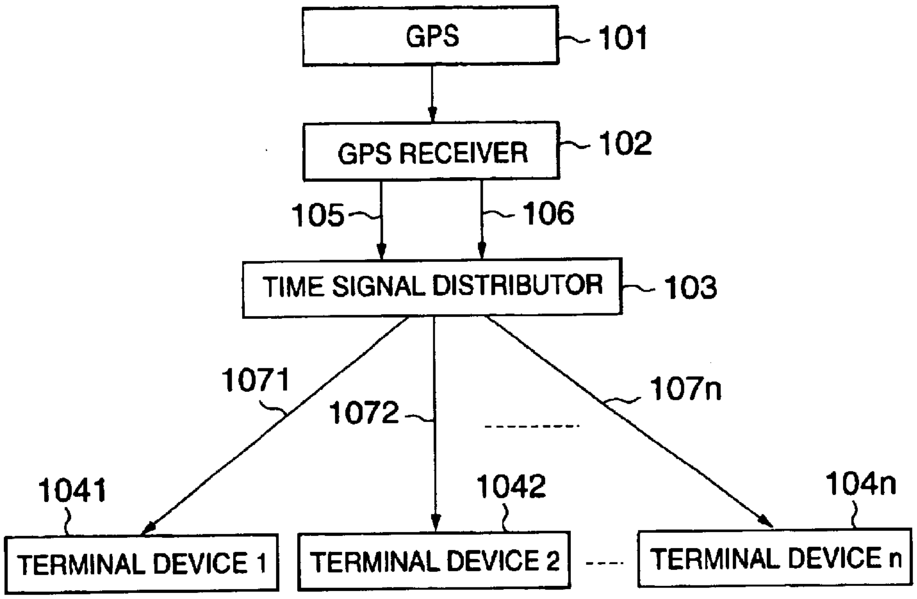
FIG. 1 is a block diagram showing a time synchronizing system according to the present invention.

FIG. 1 is a diagram showing a whole architecture of a time synchronizing system according to the present invention. The system shown in FIG. 1 is constructed of a GPS (Global Positioning System) 101, a GPS receiver 102, a time signal distributor 103 and a plurality of distributed control oriented terminal devices 1041–104*n*. Herein, terminal devices 1041–104*n* are defined as terminal devices for executing the distributed control of, e.g., a plant. The GPS receiver 102 receives a UTC synchronization reference signal and a UTC synchronization absolute time signal from the GPS 101. Then, the GPS receiver 102 transmits, to the time signal distributor 103, the UTC synchronization reference signal via a pulse signal line 105 and the UTC synchronization absolute time signal via a serial signal line 106. The pulse signal line 105 is composed of, e.g., a coaxial cable. The time signal distributor 103 transmits reference time signals to the plurality of terminal devices 1041, 1042, . . . , 104*n* via optical signal transmission paths 1071, 1072, . . . , 107*n*. The optical signal transmission path may be composed of, for example, an optical fiber. The terminal devices 1041, . . . , 104*n* are, though not illustrated, connected in one-to-one relationship to plant units 1, . . . , n on one hand, and are each connected to a host computer on the other hand. These terminal devices share the distributed control of the plant units with each other.

Figure 2:
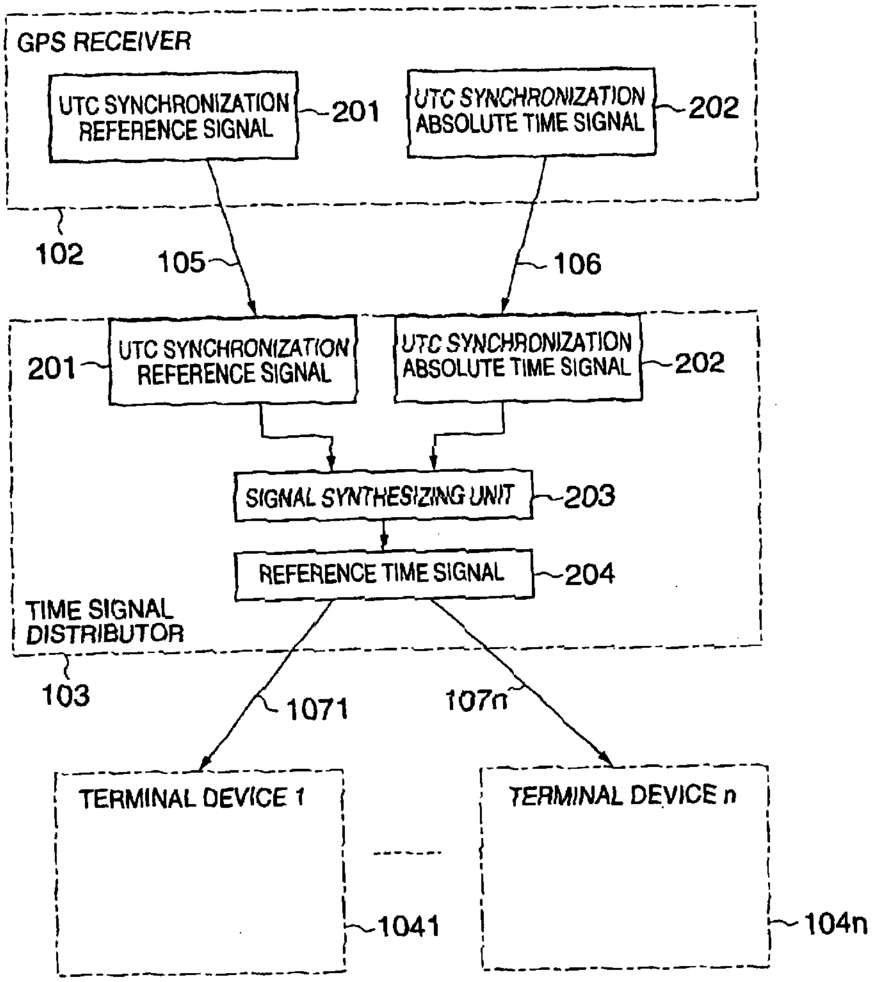
FIG. 2 is a block diagram showing a flow of signal processing within a time signal distributor.

FIG. 2 shows the time signal distributor 103 in greater details. The time signal distributor 103 includes a signal synthesizing unit 203. The signal synthesizing unit 203 synthesizes the UTC synchronization reference signal 201 received via the pulse signal line 105 from the GPS receiver 102 with the UTC synchronization absolute time signal 202 received via the serial signal line 106 therefrom, thereby generating a reference time signal 204. The time signal distributor 103 transmits the reference time signals 204 in distribution to the plurality of the terminal devices 1041–104*n* via the optical signal transmission paths 1071–107*n*.

Figure 3:
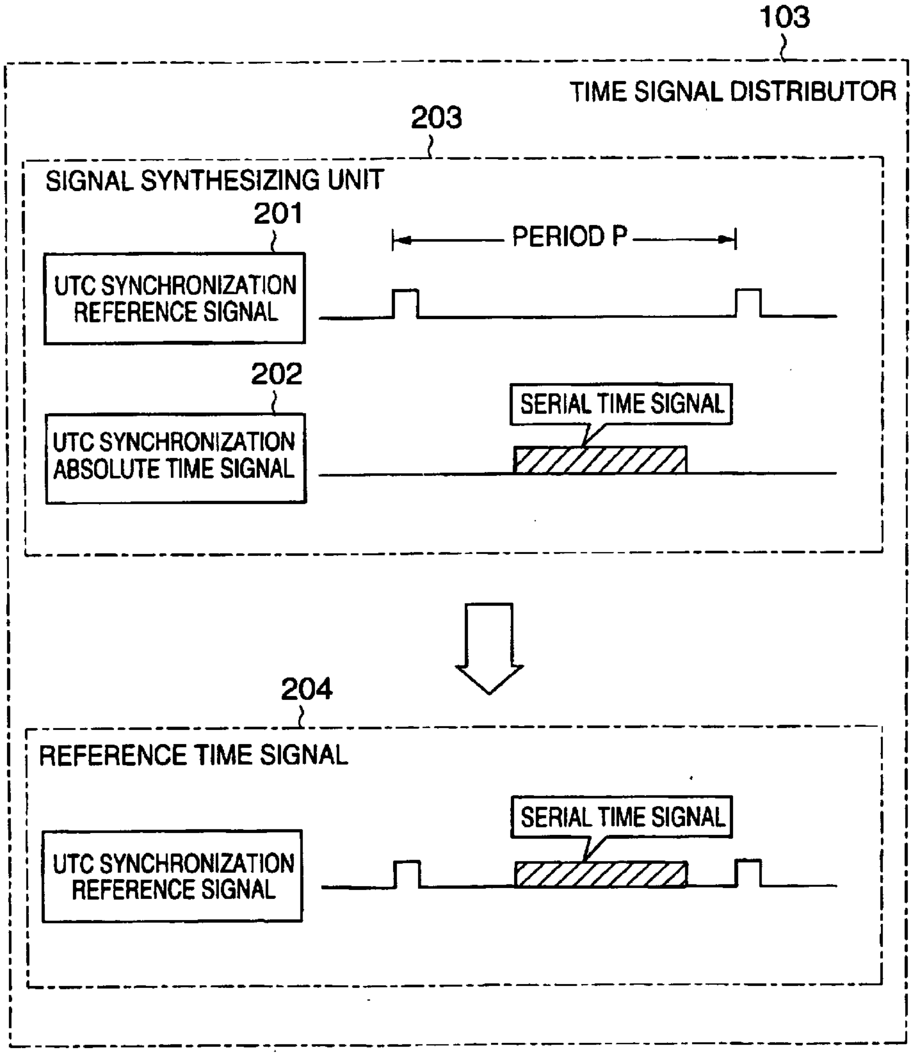
FIG. 3 is a diagram showing a structure of a reference time signal generated within the time signal distributor.

FIG. 3 is an explanatory diagram showing a function of the signal synthesizing unit 203 for generating the reference time signal 204. The signal synthesizing unit 203 synthesizes the UTC synchronization reference pulse signal 201 having a period P and transmitted from the GPS receiver 102 with the UTC synchronization absolute time signal 202 consisting of a serial time signal, thereby generating the reference time signal 204.

Figure 4:
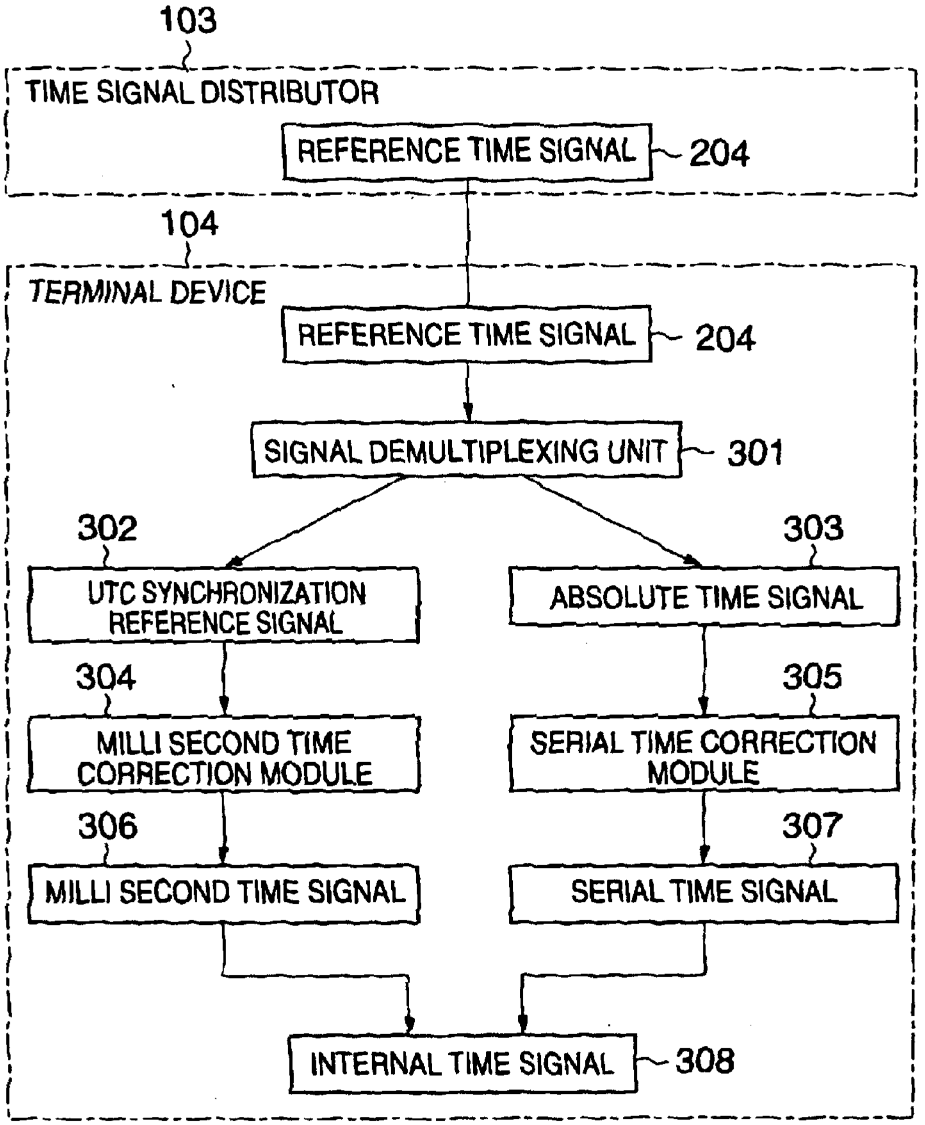
FIG. 4 is a block diagram showing a flow of signal processing within a terminal device.

FIG. 4 is an explanatory block diagram showing steps of a time synchronizing process of each of the terminal devices 1041–104*n* (which are hereinafter generically referred to as the terminal device 104) for processing the reference time signals 204 transmitted from the time signal distributor 103. The reference time signal 204 transmitted from the time signal distributor 103 is demultiplexed by a signal demultiplexer 301 within the terminal device 104 into a UTC synchronization reference signal 302 and a UTC absolute time signal 303. The UTC synchronization reference signal 302 is subjected to a time correcting process on the order of milli second in a milli second time correcting unit 304 and thus converted into a milli second time signal 306. The absolute time signal 303 receives a time correction on the order of second or larger in a serial time correcting unit 305, and is thus converted into a serial time signal 307. The two time signals 306, 307 are re-synthesized, thereby generating an internal time signal 308 synchronizing with UTC.

Figure 5:
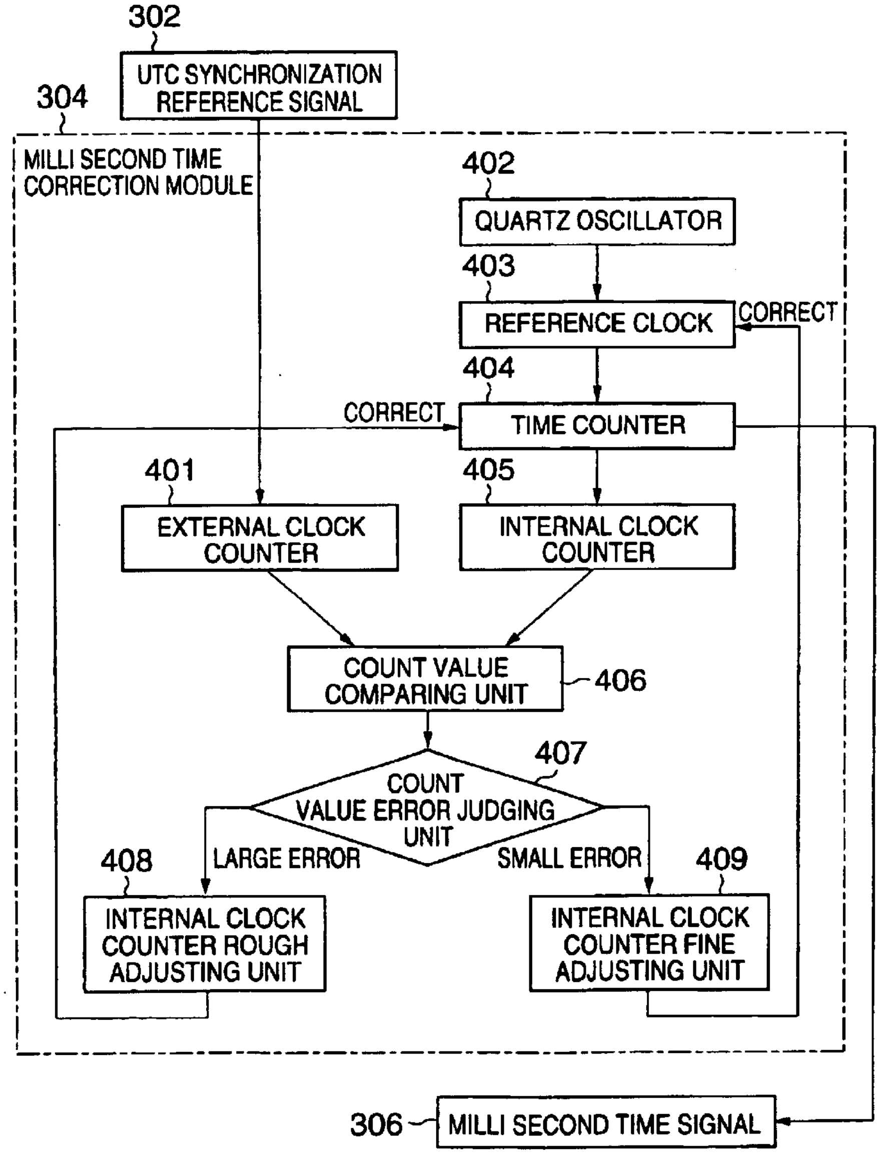
FIG. 5 is a block diagram showing a flow of signal processing of a milli second time correction module within the terminal device.

FIG. 5 is a block diagram showing the milli second time correcting unit 304. The milli second time correcting unit 304 is structured to execute a process for shortening a time required from the time synchronizing process within the terminal device 104. The milli second time correcting unit 304 includes an external clock counter 401, a quartz oscillator 402, a reference clock 403, a time counter 404, an internal clock counter 405, a counter value simultaneous comparing unit 407, a counter value error judging unit 407, an internal clock counter rough adjustment unit 408 and an internal clock counter fine adjustment unit 409. The external clock counter 401, when receiving the UTC synchronization reference signal 302 from the signal demultiplexer 301, resets a count value thereof and restarts counting. The internal clock counter 405 is reset by the time counter 404 used for the same milli second time signal 306 as the UTC synchronization reference signal 302. The counter value simultaneous comparing unit 406 compares a counter value of the external clock counter 401 with a counter value of the internal clock counter 402 with a fixed period. The counter value error judging unit 407 judges whether an error occurs in the result of comparison.

If the counter value error judging unit 407 judges that the error in the result of comparison is large, e.g., 1 ms or larger, the internal clock counter rough adjustment processing unit 408 for a synchronous correction directly corrects the time counter 404 used for the milli second time signal 306, and minimizes a time needed for establishing time synchronization by executing a process of instantaneously adjusting the time. When the error is small, e.g., smaller than 1 ms, the internal clock counter fine adjustment unit 409 makes a fine adjustment, thus unit 409 serving to minutely change a pulse width of the reference clock pulse 403 as a count pulse transmission source of the time counter 404 that performs a frequency-division count with the quarts oscillator 402 serving as a pulse source, and synchronize a value of the milli second time signal 306 used as an internal time with the UTC reference time with a minute fluctuation without directly writing this value.

Figure 6:
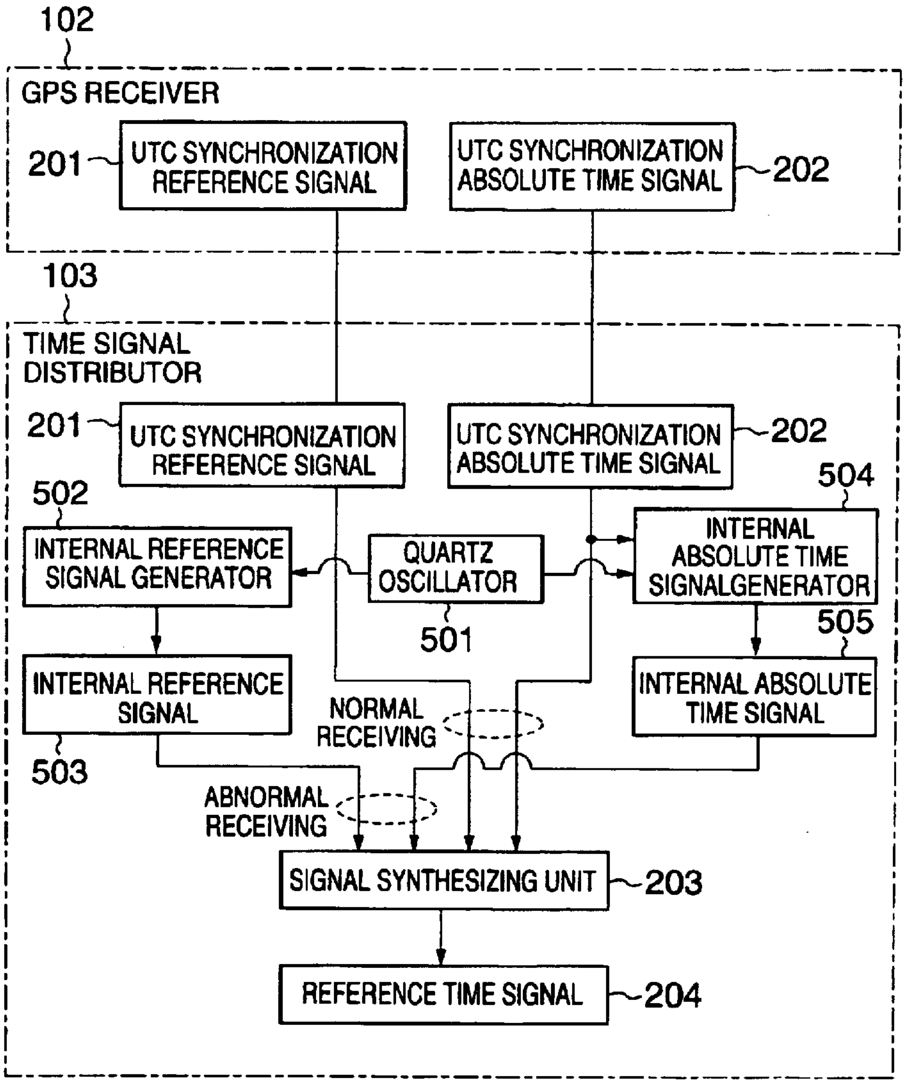
FIG. 6 is a block diagram showing a flow of time signal backup processing within the time signal distributor.

FIG. 6 is a block diagram showing steps of an internal process of the time signal distributor 103. If there is normally executed a process of taking the UTC synchronization reference signal 201 and the UTC synchronization absolute time signal 202 given from the GPS receiver 102 into the time signal distributor 103, the signal synthesizing unit 203 synthesizes the UTC synchronization reference signal 201 and the UTC synchronization absolute time signal 202 received within the time signal distributor 103, thereby generating a reference time signal 204.

Herein, the time signal distributor 103 includes a quartz oscillator 501, an internal reference signal generator 502 and an internal absolute time signal generator 504 in case the receipt of the signal from the GPS receiver 102 is interrupted due to a fault of GPS 101 or a disconnection of the signal cable or a cut-off of the power supply, and an abnormality in transmission is thereby recognized. The internal reference signal generator 502, based on an output signal of the quartz oscillator 501, generates an internal reference signal 503 used as a substitute for the UTC synchronization reference signal 201 given from the GPS receiver 102. The internal absolute time signal generator 504 receives the UTC synchronization absolute time signal 202 from the GPS receiver 102 at a normal time, and generates an internal absolute time signal 505 referring to this signal 202. If the UTC synchronization absolute time signal 202 disappears, however, the internal absolute time signal generator 504 outputs an internal reference signal 505 generated based on the output signal of the quartz oscillator 501. If the receipt of the signal from the GPS receiver 102 is interrupted, the signal synthesizing unit 203 synthesizes the internal reference signal 503 and the internal absolute time signal 505 as substitutes for the UTC synchronization reference signal 201 and the UTC synchronization absolute time signal 202, thereby generating the reference time signal 204. Then, the signal synthesizing unit 203 transmits the reference time signals 204 in distribution to the respective terminal devices.

Next, a variety of operational modes carried out by the illustrated system, will be explained.

Referring first to FIGS. 1–4, the GPS receiver 102 receives the signal from GPS 101. The time signal distributor 103 receives the UTC synchronization reference signal 201 via the pulse signal line 105 and the UTC synchronization absolute time signal 202 via the serial signal line 106. The time signal distributor 103 broadcasts the absolute time signals 202 received from the GPS receiver 102 to the respective terminal devices 104 via the optical signal transmission paths 107. Herein, the reference time signals 204 are broadcast to the respective terminal devices 104 from the time signal distributor 103. With this broadcasting, in each of the terminal devices 104, the UTC synchronization absolute time signal from the GPS receiver 102 is synchronized with the internal time signal 308 of each of the terminal devices 104, thereby unifying batchwise the times between the respective terminal devices 104.

Thus, the reference time signal synchronizing with UTC is obtained by use of the GPS 101 with a general-purposed characteristic but no restriction in terms of the utilizing place, and transmitted to each of the distributed control oriented terminal devices through the optical signal transmitting paths, e.g., the optical cables, whereby the time signal transmission system exhibiting an excellent anti-noise characteristic can be configured. Further, the time signal distributor 103 is capable of broadcasting the signals to the plurality of terminal devices, thereby attaining a simplified system having an excellent economical characteristic and making it feasible to execute a highly accurate time synchronizing process.

The time signal distributor 103 synthesizes the UTC synchronization reference signal 201 and the UTC synchronization absolute time signal 202 transmitted from GPS 101, and the synthesized signal is transmitted with a fixed period to each terminal device via one single signal line. The simplified signal line architecture can enhance the economical characteristic, and a load on the transmission process can be relieved.

Next, a contrivance for easily taking the time synchronization on the unit of milli second will be explained. The reference time signal 204 received by each terminal device 104 is demultiplexed into the synchronization reference signal 302 and the absolute time signal 303. The absolute time signal 303 is used directly as a serial time signal 307 of each terminal device 104. Further, a milli second time signal 306 that does not exist in the absolute time signal 303 is, as shown in FIG. 5, created by a time counter 404 for counting by output pulses of the reference clock 403 for performing the frequency-division count with the quartz oscillator 402 serving as the oscillation source, and he count value of the internal clock counter 405 with the time counter 404 serving as a reset source, is matched with external clock counter 401 reset at a receipt timing.

Matching the internal clock counter 405 with the external clock counter 401 involves adjusting the time counter 404 as the reset source of the counter. Hence, the count value of the time counter 404 synchronized with the external clock counter 401 is use as a milli second time signal 306, whereby the milli second time that does not incorporated into the absolute time signal 303 transmitted from the GPS receiver 102, can be synchronized.

According to this embodiment, the time signal on the order of second or larger, i.e., the much finer time signal, herein, the time signal on the order of milli second which is not contained in the reference signal from the GPS 101, can be easily synchronized with the time signal of the GPS 101 by matching the internal clock precisely with the reference clock synchronizing with the UTC, using the absolute time signal given from the time signal distributor 103.

For instantaneously taking the time synchronism, the count value simultaneous comparing unit 406 compares the count value of the internal clock counter 405 with the count value of the external clock counter 401 of each terminal device 104, and the count value error judging unit 407 obtains the error between those count values. Depending on the magnitude of the error, the execution of the correction process is switched to the rough adjustment of the internal clock counter rough adjusting unit 408 or to the fine adjustment of the internal clock counter fine adjusting unit 409. With this processing, the time needed for establishing the time synchronization can be minimized corresponding to the time difference. If the error between the count values is large, the milli second time signal 306 can be subjected to the time synchronization as approximate as UTC in the process of the internal clock counter rough adjusting unit 408. If the error between the count value is small, a count timing of the time counter 404 can be fluctuated by changing minutely the output pulse width of the reference clock 403 provided at an input stage of the time counter 404 used for the milli second time signal 306 in the fine adjusting process of the internal clock counter fine adjusting unit 409. Then, the synchronization accuracy can be enhanced without changing the value itself of the milli second time signal 306.

According to this embodiment, even if a width of deviation from the reference clock is by far larger than at a rise of processing of the time synchronizing system, the time synchronism can be momentarily taken, and a time reliability of each terminal device can be enhanced.

Next, a process corresponding to a case where the time signal can not be obtained from the GPS 101 or the GPS receiver 102, will be explained. If the time signal distributor 103 becomes unable to receive the UTC synchronization reference signal 201 and the UTC synchronization absolute time signal 202 from the GPS 101 or the GPS receiver 102, the signal synthesizing unit 203 synthesizes the internal reference signal 503 and the internal absolute time signal 505 created based on the output of the internal quarts oscillator 501, thereby generating the reference time signal 204. Then, the reference time signals 204 are transmitted in distribution to the respective terminal devices 104.

According to this embodiment, even if it is impossible to receive the time signal from the GPS 101 or the GPS receiver 102 due to some sort of fault, the time signal distributor 103 can broadcast the internal time synchronized with the GPS 101 to all the terminal devices 1041–104*n*. The reliability for ensuring the time synchronization between the terminal devices can be thereby extended.

Note that the signal synthesizing unit 203, when generating the reference time signal 301 by synthesizing the internal reference signal 503 and the internal absolute time signal 505, transmits in distribution the internal reference signal 503 as the substitute for the UTC synchronization reference signal 201 and the internal absolute time signal 505 to the respective terminal devices 104 at a timing indicated by the reference time signal 204 so that the signals 503 and 505 are not overlapped in time.

According to this embodiment, it is feasible to prevent the reference time signal used as the time synchronization signal between the terminal devices from being recognized as an error signal in the terminal devices 104 due to a signal overlap. Hence, the time synchronization between the terminal devices is ensured, and the reliability thereof is enhanced.

If unable to take in the reference time signal 204 from the time signal distributor 103, each of the terminal devices 1041–104*n* continues a time signal process by use of the internal clock counter 405.

According to this embodiment, even if each terminal device is incapable of receiving the reference time signal 204 from the time signal distributor 103 due to some sort of fault, the internal time signal 308 synchronized with the reference time signal in each of the terminal devices 104 is used, thereby making it feasible to ensure the time synchronization between the terminal devices and to attain the enhancement of the reliability.

As discussed above, according to the present invention, even when a time resolution with the accuracy as high as 1 ms or smaller is required, the GPS capable of obtaining the absolute time exhibiting the accuracy of ±1 μs anywhere on the earth is used, thereby making it possible to provide the time synchronization method and system exhibiting the good economical characteristic at the high accuracy and the high reliability in a way of ensuring the information transmission efficiency without being aware of the time synchronization.

What is claimed is:

1. A time synchronization system comprising:

a GPS (Global Positioning System) receiver for receiving a time signal from a Global Positioning System (GPS), and outputting a UTC (Universal Time Coordinated) synchronization reference pulse signal synchronizing with UTC and a UTC synchronization absolute time signal composed of a serial signal representing an absolute time; and a time signal distributor for generating a reference time signal by synthesizing the UTC synchronization reference signal and the UTC synchronization absolute time signal, and transmitting the reference time signal in distribution to a plurality of distributed control oriented terminal device, wherein said time signal "distributor is a hardware component that has no software processing delay and synchronizes" a rising edge of the UTC synchronization reference signal with UTC, and transmits the time synchronization signal to each of said terminal devices in a fixed period.

2. A time synchronization system according to claim 1, wherein said terminal device includes a reference clock operating in synchronization with the rising edge of the UTC synchronization reference signal, for generating a time signal representing a time on the finer order than a minimum time unit that is proceeded in the UTC synchronization absolute time signal, and internal clock correction means for comparing an internal time value based on said reference clock with an external time value synchronizing with the UTC synchronization reference signal, and correcting said reference clock so that the time of said reference clock synchronizes with the UTC synchronization reference signal.

3. A time synchronization system according to claim 2, wherein said internal clock correction means includes means for changing a unit delimiting width of the correction, corresponding to a magnitude of a time difference.

4. A time synchronization synchronizing system comprising:

a GPS (Global Positioning System) receiver for receiving a time signal from a Global Positioning System (GPS), and outputting a UTC (Universal Time Coordinated) synchronization reference pulse signal synchronizing with UTC and a UTC synchronization absolute time signal composed of a serial signal representing an absolute time; and a time signal distributor for generating a reference time signal by synthesizing the UTC synchronization reference signal and the UTC synchronization absolute time signal, and transmitting the reference time signal in distribution to a plurality of distributed control oriented terminal devices, wherein if impossible of receiving the UTC synchronization time signals from an internal reference signal generator for generating an internal reference signal synchronizing with the UTC synchronization reference signal, an internal absolute time signal generator for generating an internal absolute time signal equal to the UTC synchronization absolute time signal and the GE'S receiver, said signal synthesizing unit of said time signal distributor generates an internal time signal by synthesizing the internal reference signal and the internal absolute time signal, and transmits this internal time signal as a substitute for the reference time signal in distribution to said respective terminal devices.

5. A time synchronizing system according to claim 4, wherein said time signal distributor, if impossible of receiving the time signal from said GPS receiver, synthesizes the internal time signal so that the internal reference signal and the internal absolute time signal are not overlapped in time.

6. A time synchronizing system according to claim 1, wherein each of said terminal devices includes an internal clock and, if unable to receive the reference time signal from said time signal distributor, continues a time signal process by use of said internal clock.

* * * * *